(12) United States Patent
Kurtz et al.

(10) Patent No.: US 6,577,429 B1
(45) Date of Patent: Jun. 10, 2003

(54) LASER PROJECTION DISPLAY SYSTEM

(75) Inventors: Andrew F. Kurtz, Rochester, NY (US); Brian E. Kruschwitz, Rochester, NY (US); Sujatha Ramanujan, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/050,003

(22) Filed: Jan. 15, 2002

(51) Int. Cl.[7] .............................. G02F 1/01; G02F 1/33; G02B 27/10; G03B 21/00; G03B 27/42
(52) U.S. Cl. ...................... 359/279; 359/238; 359/310; 359/316; 359/559; 359/621; 359/622; 353/31; 353/84; 353/122; 355/53; 347/239; 347/255; 348/750; 362/268
(58) Field of Search ................................. 359/231, 245, 359/237, 238, 279, 310, 316, 291, 558, 559, 618, 621, 622, 712; 353/31, 33, 84, 122; 347/239, 255; 348/750, 756; 355/53, 67; 362/268

(56) References Cited

U.S. PATENT DOCUMENTS

| | | | |
|---|---|---|---|
| 3,490,827 A | | 1/1970 | vanLighten .................... 359/32 |
| 3,588,217 A | | 6/1971 | Mathisen ..................... 359/32 |
| 4,035,068 A | | 7/1977 | Rawson ...................... 353/122 |
| 4,468,093 A | * | 8/1984 | Brown ........................ 359/316 |
| 4,541,712 A | * | 9/1985 | Whitney ..................... 359/310 |
| 4,644,267 A | * | 2/1987 | Tsui et al. ................... 359/310 |
| 4,776,654 A | * | 10/1988 | Ishizuka et al. ............. 359/310 |
| 5,098,184 A | * | 3/1992 | van den Brandt et al. .... 353/31 |
| 5,191,466 A | * | 3/1993 | Gross et al. ................. 359/310 |
| 5,224,200 A | | 6/1993 | Rasmussen et al. ......... 385/146 |
| 5,272,473 A | | 12/1993 | Thompson et al. ............. 345/7 |
| 5,309,178 A | | 5/1994 | Gross ......................... 347/255 |
| 5,311,360 A | | 5/1994 | Bloom et al. ................ 359/572 |
| 5,313,479 A | | 5/1994 | Florence ...................... 372/26 |
| 5,534,970 A | * | 7/1996 | Nakashima et al. ........... 355/53 |
| 5,740,190 A | | 4/1998 | Moulton ....................... 372/23 |
| 5,828,424 A | | 10/1998 | Wallenstein ................. 348/760 |
| 5,909,316 A | * | 6/1999 | Watanabe ................... 359/622 |
| 5,949,569 A | * | 9/1999 | Shimura ..................... 359/316 |
| 6,005,722 A | | 12/1999 | Butterworth et al. ........ 359/712 |
| 6,038,075 A | * | 3/2000 | Yamazaki et al. ........... 359/622 |
| 6,084,626 A | | 7/2000 | Ramanujan et al. ........ 347/239 |
| 6,100,961 A | * | 8/2000 | Shiraishi et al. ............... 355/67 |
| 6,233,025 B1 | | 5/2001 | Wallenstein ................. 348/750 |
| 6,233,089 B1 | | 5/2001 | Nebel ........................... 359/330 |
| 6,307,663 B1 | | 10/2001 | Kowarz ....................... 359/231 |
| 6,323,984 B1 | | 11/2001 | Trisnadi ..................... 359/245 |
| 6,330,112 B1 | * | 12/2001 | Kaise et al. ................. 359/621 |
| 6,348,990 B1 | * | 2/2002 | Igasaki et al. .............. 359/238 |

* cited by examiner

*Primary Examiner*—Loha Ben
(74) *Attorney, Agent, or Firm*—Thomas H. Close

(57) ABSTRACT

A display apparatus includes a laser light source for emitting a light beam having a coherence length; a beam expander for expanding the light beam; a spatial light modulator; beam shaping optics for shaping the expanded laser beam to provide uniform illumination of the spatial light modulator, the beam shaping optics including a fly's eye integrator having an array of lenslets; a diffuser located in the light beam between the laser light source and the beam shaping optics; an electrically controllable de-speckling modulator for modifying the temporal and spatial phase of the light beam; and a projection lens for producing an image of the spatial light modulator on a distant screen.

44 Claims, 9 Drawing Sheets

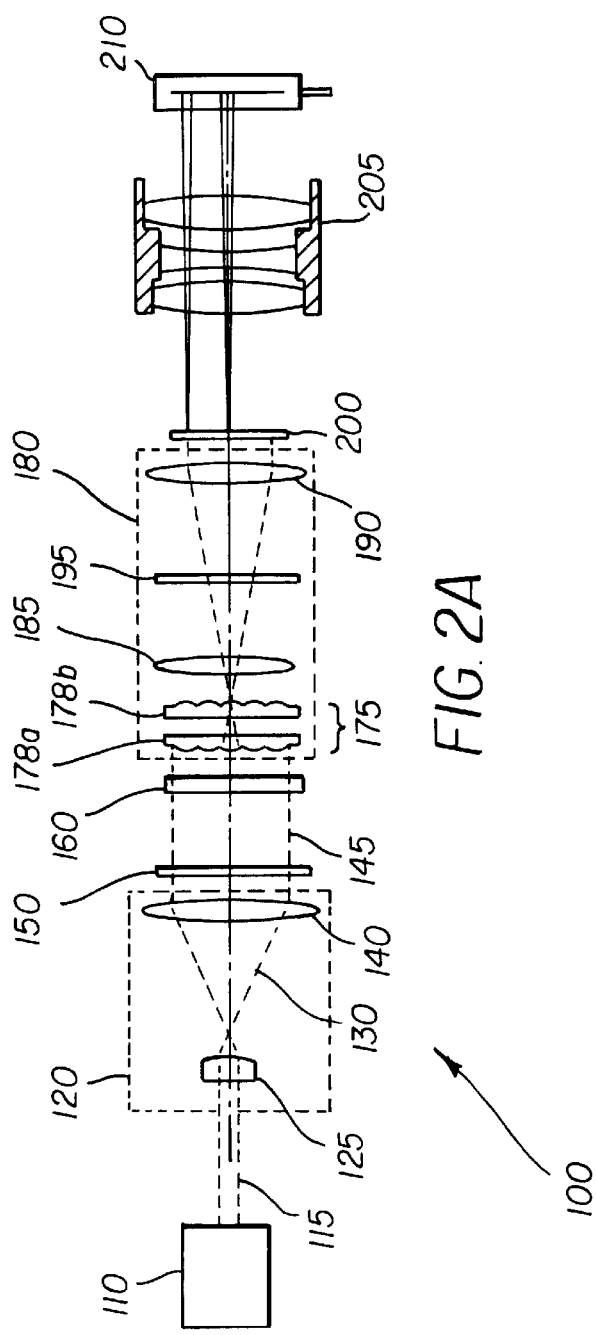
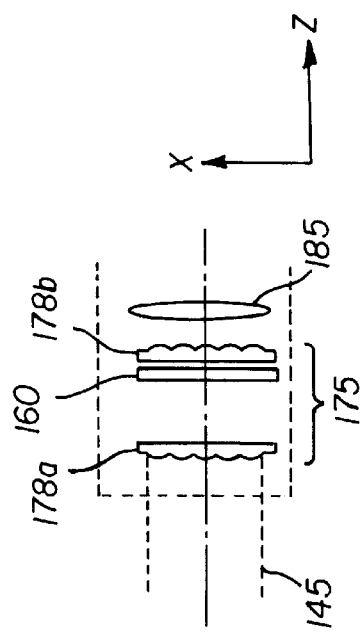
FIG. 2A
FIG. 2B

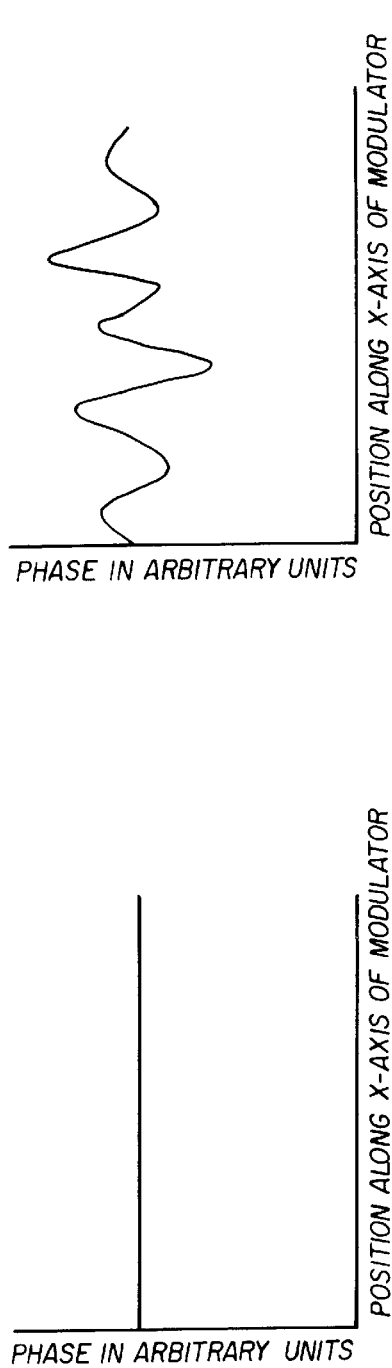
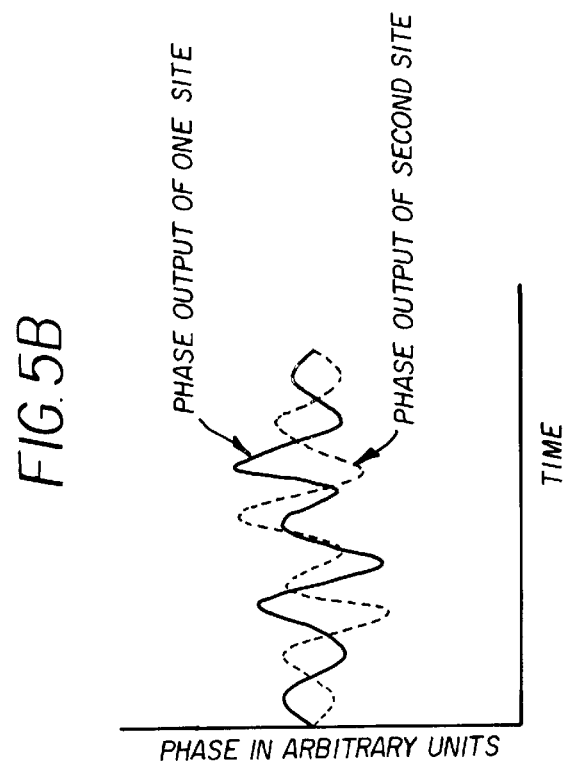
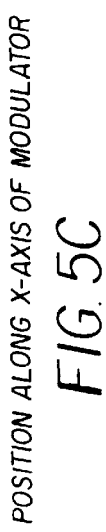
FIG. 5A
FIG. 5B
FIG. 5C
FIG. 5D

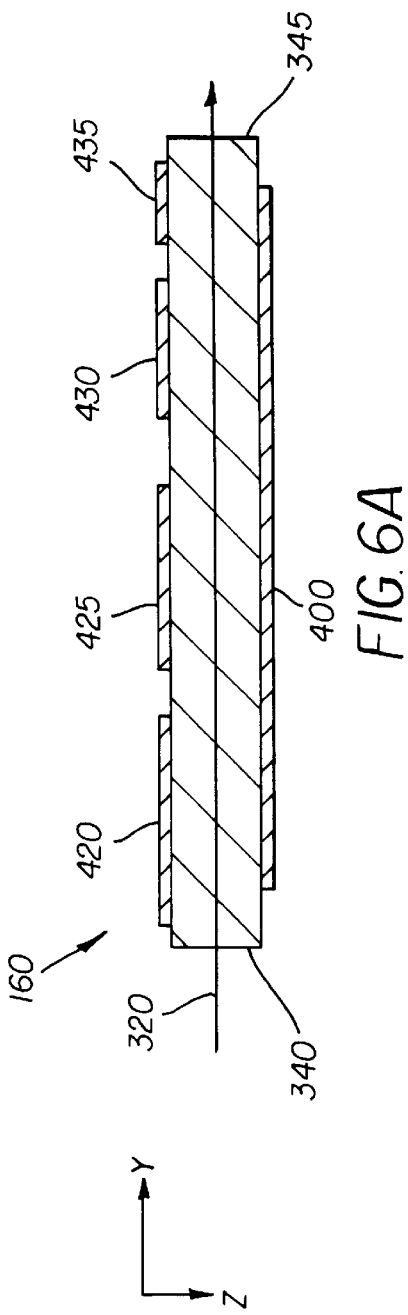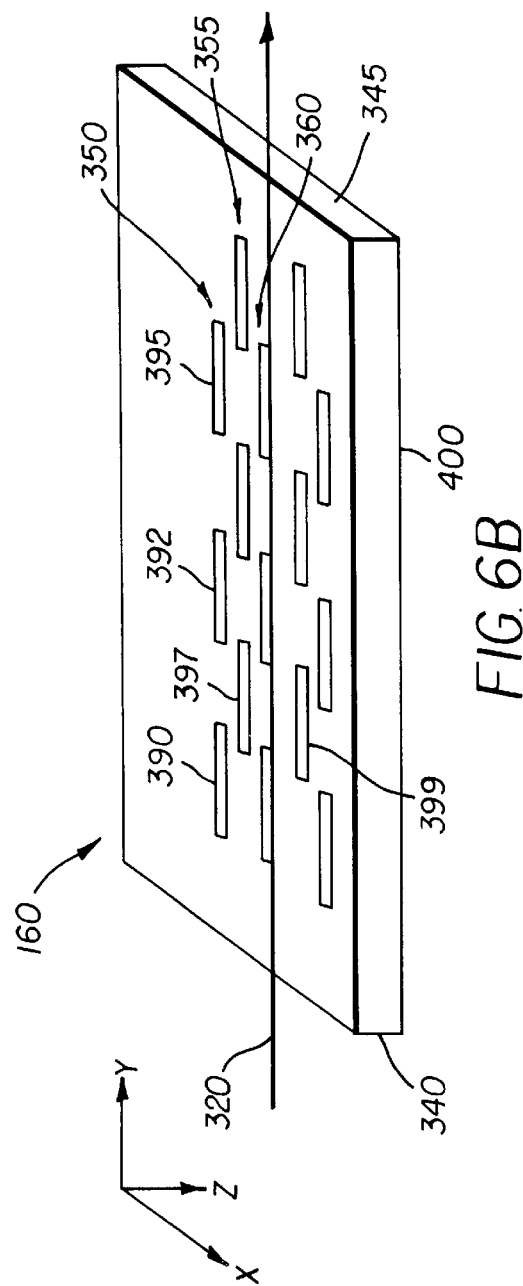

LASER PROJECTION DISPLAY SYSTEM

FIELD OF THE INVENTION

The invention relates to projection display apparatus employing a laser as a light source. More particularly, the invention relates to laser projection display apparatus having means for reducing the appearance of coherence-induced artifacts and speckle in the display.

BACKGROUND OF THE INVENTION

Projection display systems for the display of video images are well-known in the prior art. These systems can take the form of a white light source, most notably a xenon arc lamp, illuminating one or more light valves or spatial light modulators with appropriate color filtering to form the desired image, the image being projected onto a viewing screen.

Lasers have been known to be attractive alternative light sources to arc lamps for projection displays. One potential advantage is a wider color gamut featuring very saturated colors. Laser illumination offers the potential for simple, low-cost efficient optical systems, providing improved efficiency and higher contrast when paired with some spatial light modulators. One disadvantage of lasers for projection display has been the historical lack of a cost-effective laser source with sufficient power at visible wavelengths. However, such lasers (albeit, still high cost) are now produced by JenOptik and Lumera Laser, GmbH, and are mode-locked, diode-pumped, solid-state lasers, each with a nonlinear-optical system featuring an optical parametric oscillator (OPO) to simultaneously generate red, green, and blue light. This system has been disclosed by Wallenstein in U.S. Pat. No. 5,828,424, issued Oct. 27, 1998, and U.S. Pat. No. 6,233,025 issued May 15, 2001; and by Nebel in U.S. Pat. No. 6,233,089, issued May 15, 2001. Another example disclosed by Moulton in U.S. Pat. No. 5,740,190, issued Apr. 14, 1998 is developed by Q-Peak and is a Q-switched DPSS laser with an OPO system to simultaneously generate red, green, and blue light.

Spatial light modulators provide another component that enables laser display systems. Examples of two-dimensional spatial light modulators are reflective liquid crystal modulators such as the liquid-crystal-on-silicon (LCOS) modulators available from JVC, Three-Five, Aurora, and Philips, and micromirror arrays such as the Digital Light Processing (DLP) chips available from Texas Instruments. Advantages of two-dimensional modulators over one-dimensional array modulators and raster-scanned systems are the absence of scanning required, absence of streak artifacts due to non-uniformities in the modulator array, and immunity to laser noise at frequencies much greater than the frame refresh rate (>120 Hz). A further advantage of two-dimensional spatial light modulators is the wide tolerance for reduction of the spatial coherence of the illuminating beam. On the other hand, some valuable modulator technologies can be readily fabricated as high fill factor one dimensional devices, although the two dimensional constructions are more limited. Examples of one-dimensional or linear spatial light modulators include the Grating Light Valve (GLV) produced by Silicon Light Machines and described in U.S. Pat. No. 5,311,360 issued May 10, 1994 to Bloom et al.; the conformal grating modulator, described in U.S. Pat. No. 6,307,663 issued Oct. 23, 2001 to Kowarz; and the electro-optic reflective grating modulator described in U.S. Pat. No. 6,084,626 issued Jul. 4, 2000 to Ramanujan et al.

Although high power visible lasers offer new opportunities for the design of projection systems, including the possibilities of expanded color gamut and simplified optical designs, laser light is in other ways not optimum for use in image projection systems with spatial light modulators. In particular, lasers are very bright sources, which emit generally coherent light within a very small optical volume (etendue or lagrange). Etendue is the product of the focal spot area and the solid angle of the beam at the focus. Lagrange is the product of the focal spot radius and the numerical aperture. For example, a single mode green wavelength laser with a diffraction-limited beam has a lagrange of about 0.3 $\mu$m, which is about 15,000 times smaller than the lagrange for a conventional white light lamp source, such as an arc lamp. With such a small lagrange, lasers can be used very effectively in raster scanning systems, including those for flying spot printers and laser light shows, where a tightly controlled beam is desirable.

On the other hand, in an image projection system, in which an image-bearing medium such as a film or a spatial light modulator is imaged to a screen or a target plane, the high coherence and small lagrange of the laser is ultimately undesirable. In such an imaging system, the lagrange is determined by the linear size of the projected area (size of the spatial light modulator) multiplied by the numerical aperture of the collection lens. The related quantity, etendue, is calculated similarly. In many white light projection systems, the projection lens is quite fast (f/3 for example) to collect as much light as possible. Even so, the typical white light lamp source overfills both the light valve and the projection lens, and significant light is lost. For example, in a representative system using a common 0.9" diagonal light valve and an f/3 projection lens, the optimum light source would have approximately a 2.0-mm lagrange to provide proper filling without overfill. However, a standard white light lamp, with a typical lagrange of 2–10 mm, is not sufficiently bright and will generally overfill this representative system.

In the case of a laser display system using image area projection (as opposed to raster scanning), the opposite problem arises, the lasers being too bright. Furthermore, it is not desirable to illuminate the spatial light modulator with a coherent source, because of the potential for interference effects, such as fringes, which may overlay the displayed image. Diffraction artifacts can arise from illuminating the grid electrode pattern of a liquid crystal panel, an X-cube with a center discontinuity, or any dust or imperfections on the optical elements with a highly coherent beam of light. Therefore, a reduction of the source brightness (or an increase in the source lagrange) is a necessity for such laser projection systems.

A defined reduction of the source brightness can also provide an important opportunity. The projection display optical system can be designed to optimize and balance the system requirements for resolution, system light efficiency, and system simplicity. By defining the system f-number on the basis of a criterion other than system light efficiency, the specifications on other system components such as the projection lens, color filters, and polarization optics can be eased, dramatically reducing system costs compared to some lamp-based projection systems.

While laser sources can be optimized for use in projection display illumination and imaging systems, there is the consequent major disadvantage of speckle to be dealt with. Speckle arises due to the high degree of coherence (both spatial and temporal) inherent in most laser sources. Speckle produces a noise component in the image that appears as a granular structure, which both degrades the actual sharpness of the image and annoys the viewer. As such, the speckle problem, as well as the historical lack of appropriate laser sources, has inhibited the development of marketable laser-based display systems.

The prior art is rich in ways of attempting to reduce speckle. One common approach is to reduce the temporal coherence by broadening the linewidth of the laser light. Other approaches to reducing the temporal coherence are to split the illuminating wavefront into beamlets and delay them relative to each other by longer than the coherence time of the laser, see for example U.S. Pat. No. 5,224,200, issued Jun. 29, 1993 to Rasmussen et al. Dynamically varying the speckle pattern by vibrating or dynamically altering the screen is another way of reducing the visibility of the speckle pattern; see, for example, U.S. Pat. 5,272,473 issued Dec. 21, 1993 to Thompson et al. Another speckle reduction approach involves coupling the laser light into a multimode optical fiber and vibrating the fiber to cause mode-scrambling as described in U.S. Pat. No. 3,588,217, issued Jun. 28, 1971 to Mathisen.

Another family of de-speckling solutions uses a diffusing element that is moved or vibrated within the projector system. Typically, this is done at an intermediate image plane, as disclosed in U.S. Pat. No. 4,035,068, issued Jul. 12, 1977 to Rawson. One disadvantage of this approach is that the diffusion must occur precisely at the image plane or a softening of the image will occur. Also, the projection lens is complicated by the requirement to provide an intermediate image plane. A means of dynamically varying the speckle pattern by dynamically diffusing the laser beam in the illumination path of the device would be preferable. A hologram illumination system utilizing this approach has been disclosed by vanLigten in U.S. Pat. No. 3,490,827, issued Jan. 20, 1970, in which a diffuser is rotated in the focus of a beam expander. Florence discloses in U.S. Pat. No. 5,313,479, issued May 17, 1994, illuminating a light valve through a rotating diffuser. These approaches have the disadvantage of not being adaptable to uniform efficient illumination of a rectangular spatial light modulator. Butterworth et al. in U.S. Pat. No. 6,005,722, issued Dec. 21, 1999, disclose a system in which a variable-thickness plate is rotated in the illumination of a light-pipe homogenizer. When used with lasers, though, light pipe homogenizers require either a large numerical aperture or a substantial length to achieve sufficient uniformity, and offer less control with fewer degrees of design freedom than systems designed with fly's eye optics. Therefore, it is harder to control the illumination brightness while producing a uniform illumination in a compact system.

Finally, the laser projection system disclosed by Trisnadi in U.S. Pat. No. 6,323,984, issued Nov. 27, 2001, describes a design in which a wavefront phase modulator is used to impart a structured phase profile across the imaging beam. Image data is imparted to the beam by means of a linear GLV type spatial light modulator. This modulator is imaged to an intermediate plane where the wavefront modulator resides, and the intermediate image is subsequently re-imaged to a screen, with the image scanned out through the motion of a galvanometer. This system relies on the fact that a static phase profile, which is provided by the wavefront modulator, is imparted to the line image in the narrow (in-scan) direction. At any instant of time, a single point on the screen will be illuminated by one point on the phase profile. The total intensity at a single point on the screen is the "incoherent" addition of all the phases. Further the phase profile of the wavefront modulator must be such that the interference effects from the high and low phase steps generally cancel each other out. While the system of the '984 patent does provide some speckle reduction, the fact that wavefront modulator is located at an intermediate image plane within the imaging system, rather than within the illumination system, compromises the system performance, as the phase changes are limited by the constraint of not significantly effecting image quality. Also, as the aforementioned wavefront modulator is a static device, which is constructed as a passive spatially variant phase grating, it provides less control and variation of phase than an active device, and therefore potentially less speckle reduction.

Another disadvantage of using a laser as a light source in an image projector is the susceptibility of interference or the occurrence of diffraction artifacts in the light valve. This is especially true of liquid crystal modulators, wherein the thin-film structure can result in fringes in the image due to non-uniformities in the film layers. Diffraction artifacts arise from illuminating a grid electrode pattern in the light modulator with a highly coherent beam of light.

There is a need therefore for a laser-based display system that uses a spatial light modulator, allows control of the illumination brightness to optimize system design, and exhibits reduced speckle and eliminates coherence artifacts at the spatial light modulator while exhibiting high throughput efficiency.

SUMMARY OF THE INVENTION

The need is met according to the present invention by providing a display apparatus that includes a laser light source for emitting a light beam having a coherence length; a beam expander for expanding the light beam; a spatial light modulator; beam shaping optics for shaping the expanded laser beam to provide uniform illumination of the spatial light modulator, the beam shaping optics including a fly's eye integrator having an array of lenslets; a diffuser located in the light beam between the laser light source and the beam shaping optics; an electrically controllable de-speckling modulator for modifying the temporal and spatial phase of the light beam; and a projection lens for producing an image of the spatial light modulator on a distant screen.

Advantages

The present invention provides for a laser display system in which speckle is reduced in the projected image by means of an electrically controllable de-speckle modulator positioned within the illumination portion of the optical system. This method of de-speckling, using an integrated design within the projector, means that the operational performance of the system does not depend on external means, such as the vibrating screens, which may vary in application and design from one theatre to another. Additionally, as this de-speckling means functions within the illumination system, rather than within the imaging optics, as is more conventionally done, speckle can reduced to below perceptible limits without impacting the on screen image quality. Furthermore, by tuning the design and operation of the de-speckle modulator within the illumination system, this system could be optimized either on-the-fly with a feedback system, or progressively, as the laser source and spatial light modulator technologies evolve over time. Finally, this system should be mechanically and electrically robust, light efficient, and insensitive to mis-alignment.

BRIEF DESCRIPTION OF THE DRAWINGS

FIG. 2*a* is a cross-sectional view of the laser display with an electrically controlled electro-optic de-speckling modulator and a linear spatial light modulator according to the present invention;

FIG. 2*b* is a cross-sectional view of an alternate configuration for a portion of the laser display optical system depicted in FIG. 2*a*;

FIG. 5*a* is a representation of the phase profile of the output of an optical system exhibiting visibility speckle;

FIG. 5*b* is a representation of the phase profile of the output of an optical system that has reduced visibility speckle;

FIG. 5*c* is a representation of the phase profile of the output of an electrically controllable de-speckling modulator exhibiting cross talk;

FIG. 5*d* is a chart of the relative phase delay between adjacent modulator sites for an electrically controllable de-speckling modulator with both lateral and time varying phase perturbations;

FIGS. 6*a* and 6*b* are perspective views of alternate electrically controllable de-speckling modulators that can be used in the laser projection display of the present invention;

DETAILED DESCRIPTION OF THE INVENTION

Figure 1:
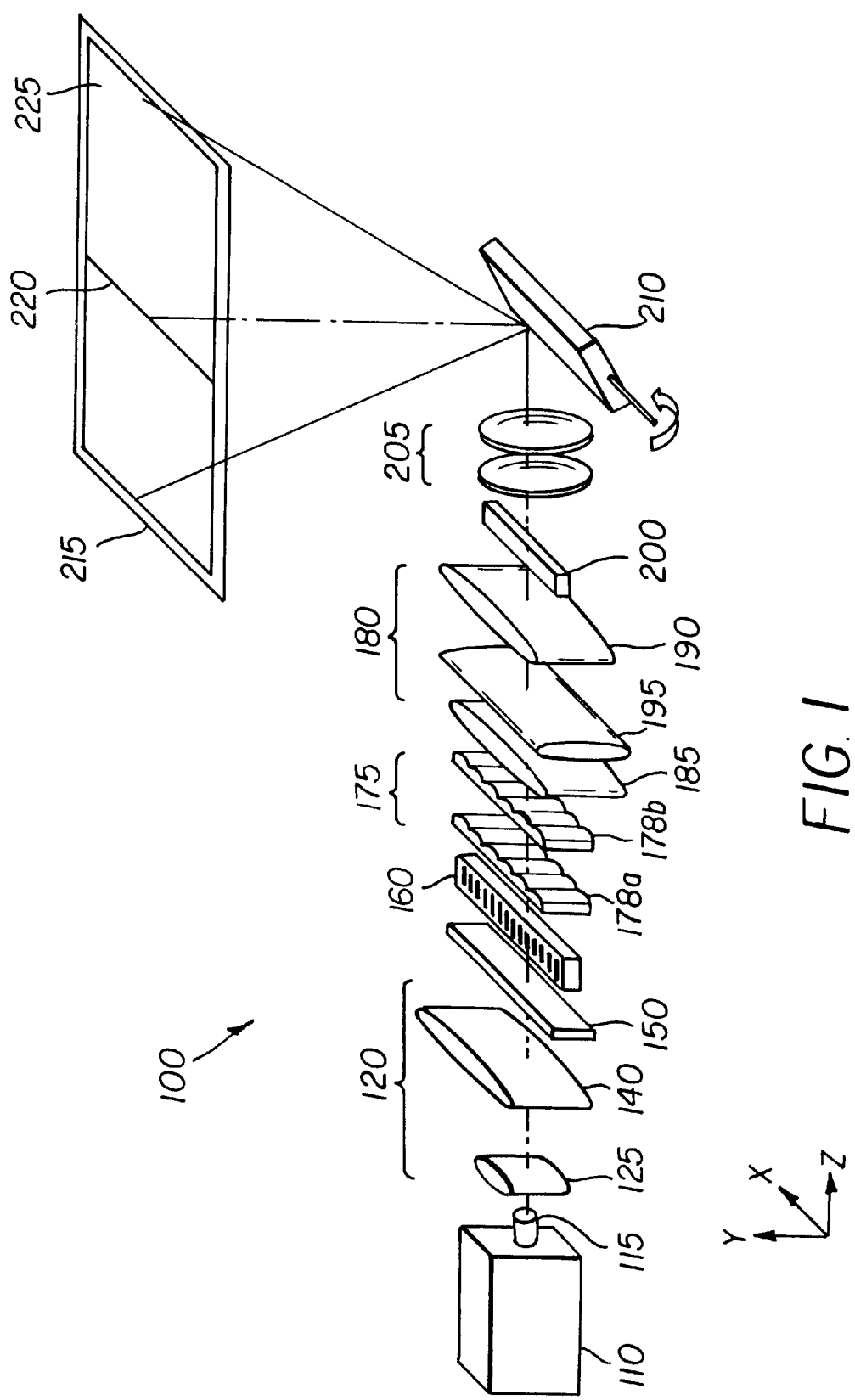
FIG. 1 is a perspective view of the laser display system with an electrically controllable electro-optic de-speckling modulator and a linear spatial light modulator according to the present invention.

Laser display system 100 according to one embodiment of the present invention, is shown in perspective view in FIG. 1, and includes a laser 110 that emits a laser beam 115 of a desired wavelength in either a continuous or pulsed fashion. The laser 110 can be, for example, a solid state laser, a fiber laser, a gas laser, or a semiconductor laser. Laser 110 is preferably a diode-laser-pumped solid state laser including a laser crystal (e.g. Nd:YAG, Nd: YLF, Nd:YVO$_4$, or Yb:YAG) that emits infrared pulses of light and includes nonlinear optics (typically optical parametric oscillators (OPOs)) that convert the infrared pulses of light from the laser crystal into red, green, and blue pulses of light. Mode-locked RGB lasers suitable for laser 110 are manufactured by Lumera Laser GmbH and JenOptik. Another suitable laser is the Q-switched RGB laser developed by Q-Peak. For simplicity, the laser display system 100 is depicted for one wavelength only. These lasers generally produce high quality single mode beams, which have moderate laser line widths (<1.5 nm), small source lagrange values (<0.5 μm), and moderately long coherence lengths $C_L$ (0.1–10.0 mm). Laser display system 100 is shown in cross-sectional view in FIG. 2*a*, to clarify some aspects of the design not readily shown in the perspective view of FIG. 1.

Beam expansion optics 120 expand the laser beam to produce a collimated beam 145 with the necessary diameter to nominally fill the aperture of beam-shaping optics 170. The beam expansion optics 120 can be, for example, an afocal pair of lenses, as is well-known to one skilled in the art of optics. Alternately, for example, a three element zooming Galilean or Keplerian beam expander could be used. The afocal pair beam expansion optics 120 comprises a diverging lens 125 and a collimating lens 140. The diverging lens 125 can be a single lens or a compound lens such as a microscope objective, and transforms the light beam 115 into a diverging beam 130. The collimating lens 140 can be a single or a compound lens, and transforms the diverging beam 130 into a collimated beam 145. This collimated beam 145 interacts with diffuser 150 and an electrically controllable de-speckling modulator 160, and then is further altered by beam shaping optics 170.

As the laser display system of FIGS. 1 and 2*a* uses a linear spatial light modulator 200, which is long in the x direction, and narrow in the y-direction, the beam expansion optics 120 and beam shaping optics 170 are constructed anamorphically, and generally use an appropriate arrangement of cylindrical lenses. In particular, it is typically desirable to flood illuminate linear spatial light modulator 200 with a long narrow line of uniform telecentrically incident light. For example, the illuminating light beam may have a uniform light profile extending 25–75 mm in the array (x) direction), whereas, the narrow cross array direction light only illuminates a 20–100 μm width, typically with either a uniform or Gaussian beam profile. In the simplified case of the laser display system of FIG. 1, the cross array optics, which condense or focus the beam of light onto linear spatial light modulator 200 are shown for simplicity as a single lens, cross array condenser 195.

Thus, in the case of the FIG. 1 system, for a laser projection display using a linear spatial light modulator 200, the beam expansion optics 120 work in the array direction only, and are thus anamorphic, providing beam expansion in the direction of the linear light valve (x-direction). In this case the beam-shaping optics 180 are also anamorphic (cylindrical cross-sections), with optical power in the x-direction, and flat surfaces in the y-direction (except for cross array condenser 195). Beam shaping optics 180 includes a fly's eye integrator 175. The fly's eye integrator 175 provides efficient, uniform illumination over the area of a linear spatial light modulator 200. The fly's eye integrator 175 includes a first lenslet array 178*a* and a second lenslet array 178*b*, which are typically identical. The first and second lenslet arrays 178*a* and 178*b* include a plurality of lenslets with cylindrical surfaces, arrayed in a one-dimensional pattern. The second lenslet array 178*b* is separated from the first lenslet array 178*a* by approximately the focal length of the lenslets on the first lenslet array 178*a*, such that each lenslet in the first lenslet array 178*a* focuses light into the corresponding lenslet in the second lenslet array 178*b*. Other designs are possible in which the first and second lenslet arrays 178*a* and 178*b* are different, but are matched to provide the desired illumination.

Alternately, the first and second lenslet arrays 178*a* and 178*b* can be integrated in a single block of glass or plastic.

Also, the invention can be accomplished without the use of the second lenslet array 178b, especially if a small diffusion angle is used.

The beam-shaping optics 180 also includes a condenser lens 185 and a field lens 190 located behind the fly's eye integrator 175. The second lenslet array 178b, works in combination with the condenser lens 185, to image the lenslets of first lenslet array 178a in overlapping fashion to provide an area of uniform illumination at the linear spatial light modulator 200. Field lens 190 provides telecentric illumination of the linear spatial light modulator 200 in order to desensitize the system to defocus errors and to minimize the total numerical aperture of the illumination. Field lens 190 nominally has a focal length equal to the lenslet focal length multiplied by the magnification of the illumination image. The spacing between the field lens 190 and the condenser lens 185 should likewise be generally equal to the focal length of the condenser lens 185 in order to make the illumination telecentric. The focal lengths of the lenslet arrays and condenser lens 185 are typically chosen to provide sufficient working distance near the linear spatial light modulator 200 that the opto-mechanics can be designed with relative ease. While individual lenslets may be as small as 100 μm in width, or as large as ~8 mm in width, the individual lenslets are typically 1–5 mm wide. The range of available lenslet sizes does depend on the manufacturing technologies used.

The linear spatial light modulator 200 generates a single line 220 of the image at any moment in time. A scanner such as a galvanometer mirror 210, a spinning polygon, or a rotating prism sweeps the image lines across the screen to form a two-dimensional area image 225 on the screen 215. In the case of the laser display system 100 depicted in FIGS. 1 and 2a, the system is configured as a post-objective scanner, with projection lens 205 located prior to galvanometer mirror 210. As an example, if linear spatial light modulator 200 has an active area 40 mm long, and the desired image size on screen 215 is 30 ft. wide, then projection lens 205 would operate with a magnification of ~230×.

A variety of different technologies can be used for linear spatial light modulator 200. As simplistically depicted in FIGS. 1 and 2a, this device is a transmissive modulator, which encodes the image data in the light beam by modulating the light in some way. This device, for example, could be an electro-optic modulator array made from PLZT which rotates the polarization of the incident light on a per pixel basis. In that case, a polarization beam splitting prism (not shown) would be located somewhere between linear spatial light modulator 200 and galvanometer mirror 210, so as to separate the modulated and un-modulated portions of the light beam. Alternately, the linear spatial light modulator 200 could be a transmissive acousto-optical array device, much like the device in discussed in U.S. Pat. No. 5,309,178, issued May 3, 1994 to Gross which imparts a phase profile to the incident beam on a per pixel basis. In that case, a Schlieren type optical system can be constructed by placing a spatial filter (not shown) at Fourier plane internal to projection lens 205. Reflective grating modulator arrays can also be used, such as grating light valve (GLV) described in U.S. Pat. No. 5,311,360, issued May 10, 1994 to Bloom et al.; a conformal grating device as described in U.S. Pat. No. 6,307,663, issued Oct. 23, 2001 to Kowarz; or an electro-optic grating as described in U.S. Pat. No. 6,084,626, issued Jul. 4, 2000 to Ramanujan et al. In these cases, the laser projection display 100 must also be modified to deflect the light beam down onto the modulator and return the reflected beam into the system (such modifications are not shown in FIGS. 1 & 2a but are within the ordinary skill in the art of optical systems design).

A diffuser 150, is disposed between the laser 110 and the beam-shaping optics 180, to modify the brightness or etendue of the laser light to match the imaging requirements of the projection system. In the case of the laser display system 100 of FIGS. 1 and 2a, which has a linear spatial light modulator 200, diffuser 150 nominally is also one-dimensional. That is, diffuser 150 only diffuses light along the length of the light valve array (x direction in the figure), while leaving the beam nominally unaltered in the y-direction. The one-dimensional diffuser 150 produces just enough diffusion in order to efficiently illuminate the light valve and not enough to introduce flare light at the image. Exemplary one dimensional diffusers include diffractive line generators, available from MEMS Optical, and elliptical holographic diffusers, available from Physical Optics Corp.

In particular, diffuser 150 is employed within the illumination optical system of the laser projection display 100 in order to reduce the source brightness (increasing lagrange). The diffuser angle $\theta_D$ and the location of the diffuser 150 are selected accordingly. The lagrange of the system will be dominated by the product of the illumination beam profile half-width on the diffuser 150 and the half-angle of the light scattered by the diffuser 150. The desired system lagrange may be inferred from the specified image resolution, which in turn depends on the resolution of the linear spatial light modulator 200 and the imaging properties of the projection lens 205. By comparison, in the typical lamp based projector, the system lagrange will be determined by the need to maximize system light efficiency. As a result, the projection lens for the laser display may have an f-number in the f/7 to f/15 range instead of the f/3 required by the prior art lamp based systems. The actual design target for the lens f-number will depend on the imaging criteria specified to determine the quality of the lens (for example, a Rayleigh or Sparrow imaging criteria could be applied).

As an example, the combination of a 40 mm long linear spatial light modulator 200 and an f/10 projection lens 205, will specify a target lagrange of the projection system of ~1.0 mm in the X-direction. In this example, the diffuser 150 can have a half angle $\theta_D$=5.0° and be placed within the illumination system such that it is illuminated by a collimated beam with 22-mm diameter. In this example, the lagrange of the laser light will be reduced from ~0.3 μm to ~1.0 mm, and a specular f/10 beam could be provided to spatial light modulator 200, assuming the intervening optical system has the proper magnification and lens structure. Thus, through the selection of the appropriate diffuser 150, the lagrange or brightness of the effective laser light source can be defined to match the needs of the optical system, thereby boosting system light efficiency and simplifying the optical design, as compared to a traditional lamp based system.

While diffuser 150 does reduce the coherence of the laser light to some extent, the laser light will remain sufficiently coherent to impart speckle into the outgoing beam. Unless this speckle is further reduced, it will be present at both the linear spatial light modulator 200 and the screen 215 as an undesired random variation in light intensity. However, the fly's eye integrator 175, which primarily provides uniform illumination to the linear spatial light modulator 200, also amplifies the effect of the diffuser 150 on de-speckling and artifact removal. This comes about by overlapping many contributions from the diffuser 150 on the linear spatial light modulator 200 and therefore in the image on the screen 215.

Although the resulting speckle within the illuminating light at the linear spatial light modulator 200 and screen 215 is significantly reduced in size and magnitude compared to a similar system without the fly's eye integrator 175, this remaining speckle can still be objectionable in critical applications. A projection display, which combines a very high to screen magnification, a high gain screen, and observers viewing the screen near the human visual acuity limits, is such a critical application.

A primary purpose of the present invention is to provide a laser projection display that employs a combination of internal means to de-speckle the output of a pixilated optical system. Speckle in such a system can be reduced when adjacent pixels or groups of pixels are not perfectly in phase with one another either spatially or temporally. A locally uniform phase profile, which extends across a group of pixels, and which can exhibit speckle is shown in FIG. 5a. The present invention uses means (including electrically controllable de-speckle modulator 160) to alter the phase profile shown in FIG. 5a across an extent of the light beam such that it more closely resembles the profile shown in FIG. 5b. FIG. 5b shows a more random phase profile in which at any given instant in time adjacent regions along the x-direction see different phase profiles. Also effective, would be a geometry that provides a periodic or quasi-periodic profile as shown in FIG. 5c, which can for example originate with crosstalk between adjacent modulator sites. While periodic or quasi-periodic phase profiles reduce speckle, other undesired artifacts may be introduced by such periodic phase structures. For that reason, the preferred mode of operation according to the present invention is one creating a phase profile as seen in FIG. 5b. In a preferred embodiment of the present invention, the laser projection display 100 includes an electrically controllable electro-optic de-speckling modulator 160, having a series of modulator sites that receive control signals to provide localized random phase changes to the incident light, thereby helping to reduce speckle visibility in the images displayed by the system. It should be noted that there need not be a one to one correspondence between the pixels of the spatial light modulator in the optical system and the modulator sites of the electrically controllable de-speckling modulator 160. In fact the optical system need not be pixilated at all, and for example could use an analog medium such as film for the image modulation.

The electrically controllable de-speckling modulator 160 used in the laser display 100 of the present invention provides enough variation of phase within the light beam that the viewer or viewing system receives a reduced speckle image when the modulator is used in conjunction with an appropriate optical system. By independently electrically addressing the modulator sites, each site in the electrically controllable de-speckling modulator 160 can introduce phase delays in the light beam with respect to the neighboring sites. A different voltage or voltage duration is applied to each site (or group of sites), thus producing a phase delay corresponding to as much as several waves of propagation in the light. This variation to the phase profile significantly reduces the appearance of speckle. By picking a voltage distribution that spatially provides a perturbed phase front and varying it in time, both spatial and temporal phase variation is introduced into the light beam.

The electrically controllable de-speckling modulator 160 is included in the optical system of the laser projection display in such a manner that its' controllable spatially varying random phase profiles translate into a reduction of speckle. The electrically controllable de-speckling modulator 160 reduces speckle through a reduction of coherence, or a randomization of phase in a light beam spatially and/or temporally. The inclusion of the electrically controllable de-speckling modulator 160 in the optical system serves to effectively scramble the phase profile of a light beam by varying the refractive index profile in the medium through which light travels.

Figure 3:
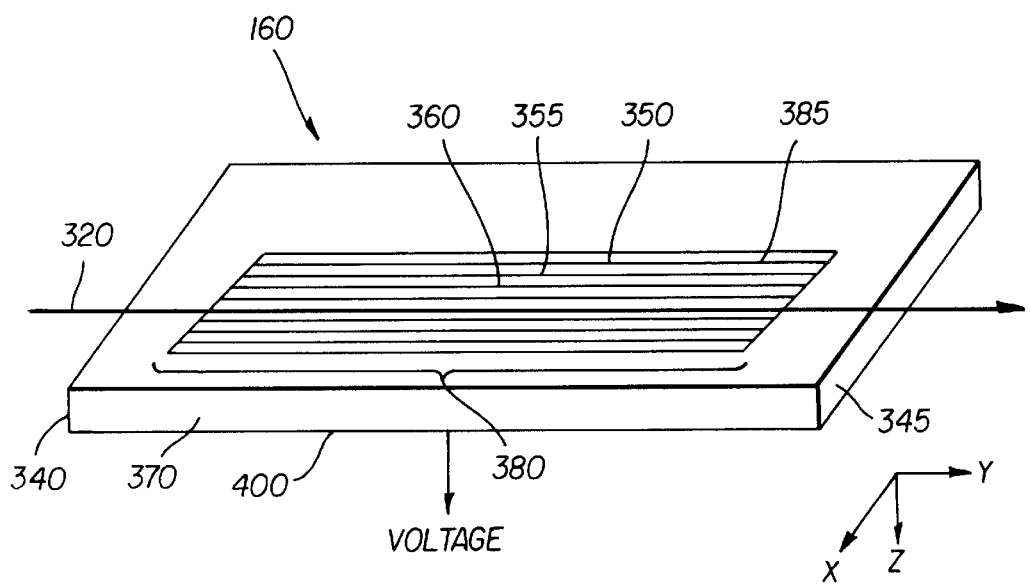
FIG. 3 is a perspective view of a first version of the electrically controllable electro-optic de-speckling time/phase delay modulator used in the present invention.

Referring to FIG. 3, there is shown a first example of an electrically controllable de-speckling modulator 160 of a type that could be used in the laser projection display of the present invention. The electrically controllable de-speckling modulator 160 is a patterned device including a collection of addressable modulator sites that produce controlled time or phase delays with respect to adjacent pixels in accordance with signals, or data provided to individual modulator sites. Commonly-assigned co-pending U.S. Ser. No. 09/924,619, filed Aug. 8, 2001, by Ramanujan et al, describes the design and operation of de-speckling modulators in greater detail than provided here.

The electrically controllable de-speckling modulator 160 comprises a bulk electro-optic substrate 370 with a series of individual modulator sites 350, 355, 360, etc. Each modulator site 350 has a delay region 380 through which a beam of light 320 encounters a time or phase delay in relation to the electric field applied between top electrode 385 and bottom electrode 400. Beam of light 320 enters bulk electro-optic substrate 370 through an input facet 340, after which it traverses the modulator, and exits through output facet 345.

The choices of electro optic materials from which to build the electrically controllable de-speckling modulator are numerous and include Lithium niobate, lithium tantalate and PLZT. For the sake of simplicity, further discussion of the parameters for the electrically controllable de-speckling modulator will center around the use of lithium tantalate illuminated at 633 nm, but it should be understood the geometry is applicable to a variety of materials and illumination wavelengths. If a different material is employed, care must be taken to ensure the correct axes are employed. For example, use of PLZT in such a device design can produce orders of magnitude greater phase delay along a modulator site due to the larger electro-optic coefficient. However, the crystal must be oriented in a manner such that the applied electric field interacts with the optical field through the appropriate axes of the crystal.

Figure 4:
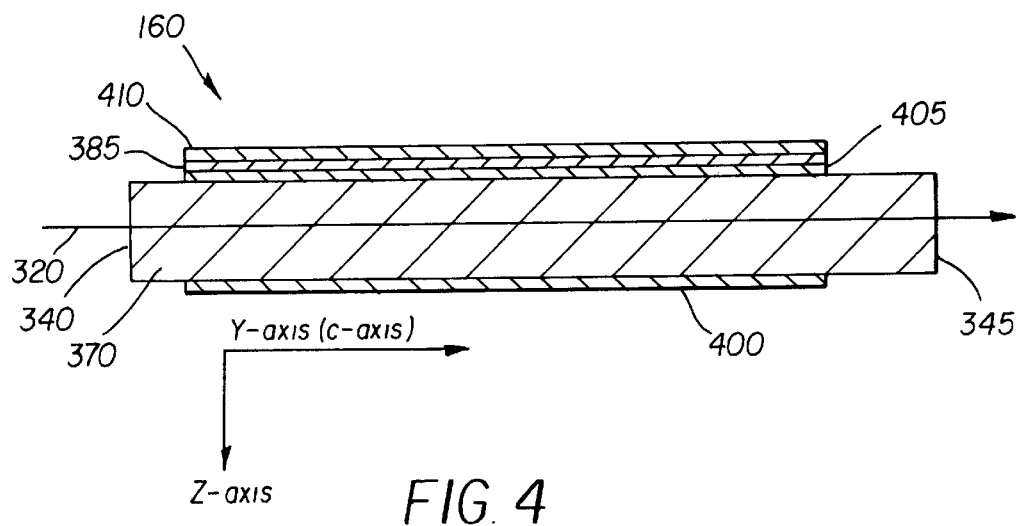
FIG. 4 is a cross-sectional view of the first version of the time/phase delay modulator used in the present invention.

In the case of lithium tantalate, the geometry represented here is shown as y-cut, meaning that light propagates along the y-direction and electric field is applied along the z-direction. For best results, the light traveling through the modulator is polarized along the x-direction (transverse direction). For the purposes of the electrically controllable de-speckling modulator discussions, light propagation direction will be referred to as the c-axis so that there is no confusion between the crystal axis and the propagation axis. (Note: FIGS. 3, 4, and 6 use the standard coordinate system for electro-optic crystals, whereas FIGS. 1, 2, 8, 9, and 10 use a typical optical coordinate system, with light propagation along the z-axis.) Other cuts and geometries of the crystal maybe employed, but in this first example, y-cut is optimal.

FIG. 4 shows a cross section of the electrically controllable de-speckling modulator 160 with a beam of light 320 propagating along the y-axis of the modulator. It may be advantageous for the input and output facets of the modulator to be antireflection coated. Furthermore, since the device effectively perturbs phase fronts, it should be recognized that input light to the modulator can come from a variety of sources simultaneously. The electrically controllable de-speckling modulator 160 may operate on several wavelengths and angular extents simultaneously.

A single modulator site can be defined as the region between top and bottom electrodes 385 and 400. A ray of light, as defined along the x-direction of FIG. 3 propagates along the crystal between top and bottom electrodes 385 and 400. Light passing through that region acquires a phase change $\Delta\phi$ defined as follows:

$$\Delta\phi = (\pi/\lambda) n^3 r_{33} l\, V/d_o \tag{1}$$

As is seen in Eq. 1, the phase change $\Delta\phi$ is a function of applied voltage V, length of propagation l, distance between electrodes d, wavelength of light $\lambda$, refractive index n, and the r33 coefficient for y-cut Lithium tantalate. Given reasonable fabrication parameters such as propagation lengths from 5–50 mm, thickness of 500 $\mu$m, and illumination wavelength in the red spectrum, phase delays of as much as several wavelengths can be generated for operating voltages between 0V and 160V. Understandably, all the input parameters can be altered to render more or less delay along a given channel or modulator site. All delays have been represented by distance or number of waves. It is equivalent to discuss delay as a time delay given by the distance of delay divided by the propagation velocity of the light in the medium.

Referring back to FIG. 3, a plurality of modulator sites 350, 355, 360 is defined by several regions such as the one shown in cross section in FIG. 4. A top electrode 385 and bottom electrode 400 defines each modulator site. It may be useful on fabrication to have a common unpatterned electrode on one side of the device as opposed to patterning both the top and bottom of the device. This allows modulation through differential voltage applied to the electrodes on one side of the device. The de-speckling modulator is electrically controllable in the sense that the device consists of a series of modulator sites which are addressed by a patterned electrode structure, and which can respond individually or in groups, to pre-determined applied control signals. Each modulator site can be operated independently through means of different applied voltages, different address times, or combinations of both. The electrically controllable de-speckling modulator 160 can be used as either an analog voltage driven modulator, a pulse width modulated device, or a combination of both. The control signals applied to the de-speckling modulator could also be derived from a feedback loop, which monitored the reduction of speckle visibility or contrast, and then adjusted to drive signals to maintain or further reduce speckle magnitude. The width of any given electrode along the x-direction can be anywhere from sub-wavelength in width to literally millimeters in width.

It may be of use to periodically switch the polarities of the top and bottom electrodes, or to introduce a blanking pulse. Such bi-polar operation allows dissipation of space charge in the bulk electro-optic substrate 370. Furthermore, because the operational voltages can be quite high and because the optical field may not be well contained, the electrodes may be patterned with material such as SiO2 under the electrode to act as a buffer layer 405 (see FIG. 4). Also, an overcoat 410 of acrylic or other insulating material may be applied to prevent arcing in air.

The device structure provided for the electrically controllable electro-optic de-speckling modulator 160 of FIGS. 3 and 4 is only one example of this type of de-speckling modulator that could be used in a laser projection display. A second such example is shown in cross section in FIG. 6a, where each modulator site consists of a series of electrodes 420–435 spaced along the y-axis of the crystal. A modulator site can be activated using all or a subset of the electrodes, for instance electrodes 420, 425, and 430, thus providing variable delay even with a single drive voltage. Each electrode (which have distinct lengths) can be driven such that the applied voltage in conjunction with the electrode length can give different known fractions of wavelength delay. For instance, the first electrode may produce a $\frac{1}{8}$ wavelength delay, the second $\frac{1}{16}$, the third $\frac{1}{32}$, and so forth. The applied voltage can be adjusted such that the same length of electrode renders the same number of wavelengths delay for different wavelengths of light. Additionally the electrodes can be modulated in time individually within each modulator site thus further randomizing the phase.

Another example of an electrically controllable de-speckling modulator useful in a laser projection display, is shown in FIG. 6b. The modulator has added complexity, but greater control as compared to that shown in FIG. 6a. FIG. 6b has different local electrode geometries between adjacent modulator sites. By spacing electrodes 390, 392, 395 within a modulator site (350 for example) and staggering electrodes 390, 397, 399 between adjacent/nearby modulator sites, the modulator is less prone to electrical cross talk effects shown in FIG. 5c. Similar results can be achieved by allowing space between electrodes both between adjacent modulator sites 350, 355, 360 as well as within a single site 350. On the other hand, as the electrically controllable de-speckling modulator is fundamentally a phase scrambler, intended to randomly alter the phase fronts of the incident light in localized areas, the introduction of cross talk between modulator sites can help the intended result by introducing further phase variations. In the event that the designer wishes to contain cross talk effects, the electrodes will need sufficient gaps between them to prevent cross talk. It should be understood that there are other exemplary structures for the electrically controllable de-speckling spatial light modulator, beyond those depicted in FIGS. 3, 6a and 6b, which could be conceived of, and which could be used within a laser projection display 100 according to the present invention.

Because the appearance of speckle can be reduced both by spatial variations to the lateral phase profile or by time variations between adjacent regions, the operation of the electrically controllable de-speckling modulator can be modified to accommodate both. In the first case, a lateral electric field distribution is established as a function of address to the electrodes. This distribution, in turn, defines a lateral phase perturbation. In the case of temporal variation, the same field profile may be employed at different sites. However, in time, the relative fields are varied such that adjacent regions are out of phase with each other. Ideally, a combination of both methods of operation, as shown in FIG. 5d, provides the best result.

Figure 7B:
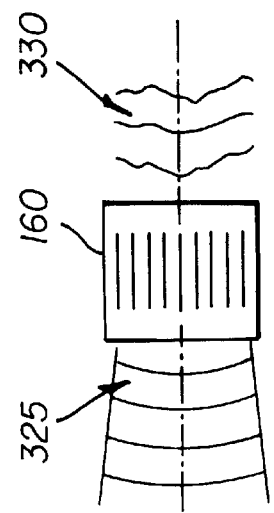
FIGS. 7*a* and 7*b* illustrate the effect of a modulator of the present invention in terms of an unaffected wavefront and a distorted wavefront respectively, in the case of incident collimated light.
Figure 7A:
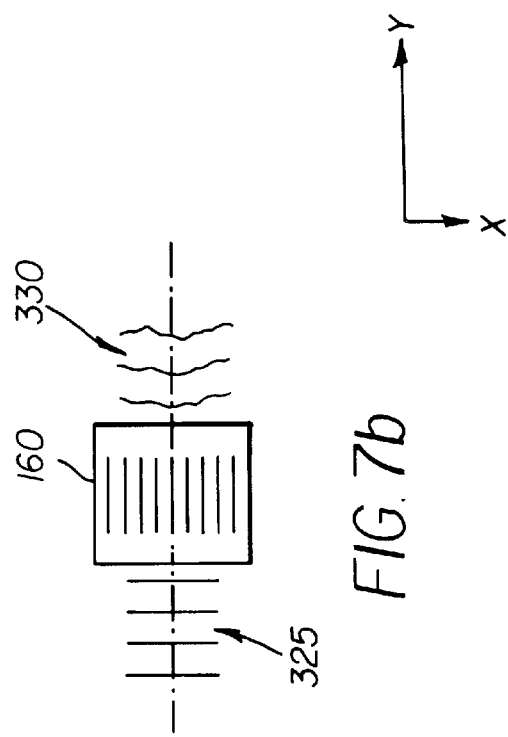
Figure 7D:
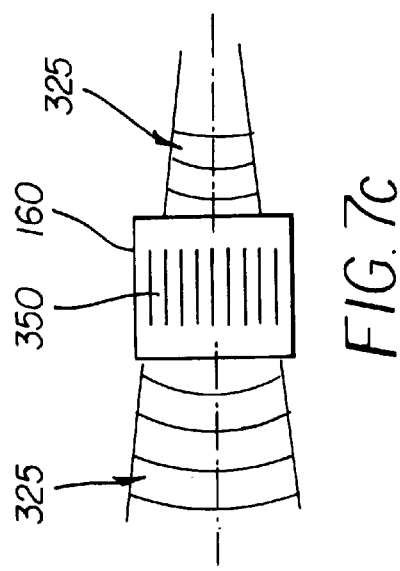
FIGS. 7*c* and 7*d* illustrate the effect of a modulator of the present invention in terms of an unaffected wavefront and an aborted wavefront respectively, in the case of incident convergent light.
Figure 7C:
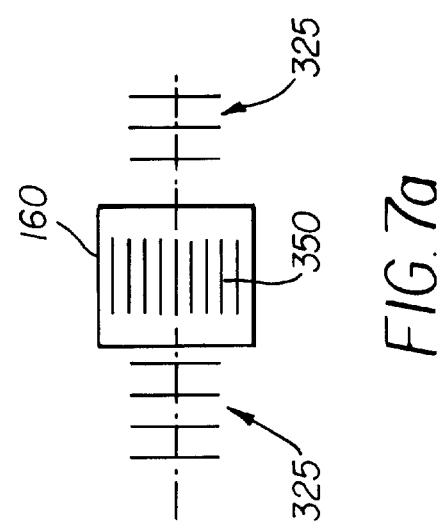

An electrically controllable de-speckling modulator 160 can function to distort or scramble the phase fronts of the incident light. Conceptually, this effect is illustrated in FIGS. 7a and 7b for the case of collimated light, with planar parallel wave fronts 325 directed at normal incidence onto the modulator 160. As illustrated in FIG. 7a, zero drive voltage is applied to the modulator 160, and the wave fronts 325 emerge unaltered. As illustrated in FIG. 7b, voltages are applied to the modulator sites 350, and distorted wave fronts 330 emerge from the device. FIGS. 7c and 7d illustrate the equivalent cases, where an electrically controllable de-speckling modulator 160 is located in convergent space within an optical system. It should be understood that these wave front distortions are exaggerated in extent and only representative of the general concepts. They are not necessarily depictions of wave fronts located 1λ apart.

While an electrically controllable de-speckling modulator 160 can distort wavefronts by providing spatial and temporal phase perturbations, the ability of the modulator to affect the appearance of speckle also depends on the design of the system in which it is used. The present invention predominately considers the case where the electrically controllable de-speckling modulator provides a small delay along a modulator site compared to the coherence length ($\Delta\phi<<C_L$) of the light source. Indeed, lasers can have coherence lengths ranging from fractions of a mm to several meters in extent (0.1–5.0 mm for Red/Green/Blue optical parametric oscillator type lasers), whereas, the lithium tantalate based de-speckle modulator will only provide a few waves of delay. Thus, as previously stated, this device can be used to cause time variant wave front distortions or aberrations, but not to directly alter the spatial or temporal coherence in an appreciable way. Fortunately, the time and space variable phase can be used to vary or average the speckle within the projected image, thereby reducing the perceptibility of the speckle if the variations are more rapid than the response time of the human eye.

On the other hand, an electrically controllable de-speckling modulator could be used in a system where the provided phase delay is on the same order as the coherence length of the light source ($\Delta\phi\sim C_L$). For example, the typical white light source, such as an arc lamp, emits light with a coherence length $C_L$ and width only several wavelengths in extent, which is comparable to the phase delay from the lithium tantalate based device. Alternately, an electrically controllable de-speckling modulator with about 1.0 mm of delay, could be paired with a small coherence length laser (such as an OPO type laser), to again basically match delay and coherence length ($\Delta\phi\sim C_L$). In such cases, the electrically controllable de-speckling modulator can be used in various ways within the optical system to alter both the spatial and temporal coherence directly. If the controllable phase delay significantly exceeds the coherence length of the light from the light source ($\Delta\phi>>C_L$), even more dramatic effects can be realized with an electrically controllable de-speckling modulator 160.

The effectiveness of the electrically controllable de-speckling modulator 160 in reducing speckle visibility depends both on the structure and performance of the specific device (FIGS. 3, 6a and 6b show such exemplary devices) and the manner in which it is used within laser projection display 100. In particular, an electrically controllable de-speckling modulator 160 may be located prior to the first lenslet array 178a of fly's eye integrator 175 as depicted in FIGS. 1 and 2a, or within fly's eye integrator 175 as depicted in FIG. 2b, or similarly after the second lenslet array 178b of fly's eye integrator 175. In the typical fly's eye integrator based optical system used to illuminate a one dimensional device (spatial light modulator 200), the number (N) of lenslets in each lenslet array (178a and 178b) is relatively small, with ~6–20 lenslets providing adequate light uniformity. By comparison, the typical spatial light modulator 200, will be an array comprising a relatively high number (M) of tightly packed pixels, with between 256 to 4096 pixels serving most applications. The number (P) of modulator sites in the electrically controllable de-speckling modulator 160 of FIGS. 1 and 2 is determined by their effectiveness in reducing speckle visibility, and is not tightly dependent on either the number (N) of lenslets or the number (M) of modulator pixels.

Assuming that electrically controllable de-speckling modulator 160 is operating under the condition that the phase change or delay it introduces is small relative to the coherence length ($\Delta\phi<<C_L$) of the laser light beam (a few wavelengths vs. a few mm), then electrically controllable de-speckling modulator 160 can be used to locally alter the wavefronts of the light beams, as in FIGS. 7a–d. In this case, there will be many modulator sites per lenslet (P>>N). In order to modify (distort) the wavefronts of imaging beams of lights within the illumination system, electrically controllable de-speckling modulator 160 is used in the far field of the imaged plane (or in one of its conjugate planes). Thus, in the FIG. 1 system, where electrically controllable de-speckling modulator 160 is located prior to the first lenslet array 178a, and where this lenslet array is image conjugate to the spatial light modulator 200, electrically controllable de-speckling modulator 160 is minimally offset from the lenslet array by more than the depth of focus (DOF), and is optimally in the far field of this conjugate plane (approximately >10*DOF).

Similarly, as shown in FIG. 2b, if electrically controllable de-speckling modulator 160 is located between first lenslet array 178a and second lenslet array 178b, and in proximity to second lenslet array 178b, then electrically controllable de-speckling modulator 160 is by definition located in the far field of the first lenslet array, and can therefore phase alter the wavefront structure. As the optical system can deliberately be designed to have the light underfill the lenslets of the second lenslet array 178b, the required fill factor for the electrically controllable de-speckling modulator 160 can be reduced, which may permit alternative and less demanding electrode addressing schemes to the modulator sites. Similarly, electrically controllable de-speckling modulator 160 could be located after second lenslet array 178b, and most likely between second lenslet array 178b and condenser lens 185. For these various cases, the wavefront aberrations induced by electrically controllable de-speckling modulator 160 mostly effect the localized interference of wavefronts which contributes to the creation of speckle. This configuration may also effect the quality of the imaging provided by the beam shaping optics, thereby causing some softness at the edges of the illuminated area.

Alternately, for this same case where the electrically controllable de-speckling modulator 160 provides phase changes or delays which are small relative to the coherence length ($\Delta\phi<<C_L$) of the laser light, the electrically controllable de-speckling modulator can be positioned within the optical system to act more like a diffuser which scatters or diffracts light, rather than altering the imaging wavefronts within the illumination system. In this case, the number of modulator sites is large compared to the number of lenslets (P>>N), and the electrically controllable de-speckling modulator 160 is located in the near field of the imaging plane within the illumination system. That is, electrically controllable de-speckling modulator 160 is nominally located just before or just after first lenslet array 178a, and should be nominally within the near field (<10*DOF) of the conjugate image plane (conjugate to the image plane at spatial light modulator 200).

If, on the other hand, it is assumed that electrically controllable de-speckling modulator 160 is operating under the condition that the phase change or delay it introduces is on the same order as the coherence length ($\Delta\phi\sim C_L$) of the light from the laser source 110, then the device can directly effect the relative temporal coherence of the light for one light beam relative to another. In this case, if the number of modulator sites is identical to the number of lenslets (P=N), and the modulator sites are aligned to correspond to a given lenslet of lenslet array 178a, the temporal coherence is altered for the light beam transiting a given lenslet and modulator site, relative to the others. Each beam will create its own speckle pattern within the illuminated area at spatial light modulator 200, but the ensemble speckle will vary in time as the modulator sites are randomly driven. In this case, electrically controllable de-speckling modulator 160 can be located prior to first lenslet array 178a, but without any strict far field or near field positional restriction. Likewise, electrically controllable de-speckling modulator 160 can be located between the first lenslet array 178a and second lenslet array 178b, or just after second lenslet array 178b. This configuration would work even better if the phase delay is significantly (2×–3×or more) larger than the coherence length ($\Delta\phi > C_L$).

Alternately, an electrically controllable de-speckling modulator 160, operating under the condition that the phase change or delay it introduces is on the same order as the coherence length ($\Delta\phi \sim C_L$) of the light from the laser source 110, such that the electrically controllable de-speckling modulator can directly effect the relative temporal coherence of the transiting light, can be provided within laser display 100 with a number (P) of modulator sites greater than the number (N) of lenslets (P>N). In this case, the electrically controllable de-speckling modulator can be used to randomize the coherence spatially across each lenslet array, and thus across the spatial light modulator 200 and screen 215. In this example, electrically controllable de-speckling modulator 160 is not used to alter the wavefronts with small phase aberrations, but to alter the coherence of one spatial area relative to another, and effectively synthesize a nearly incoherent source. If the number of modulator sites is modestly greater than the number of lenslets (P=8*N for example), the electrically controllable de-speckling modulator 160 can be located prior to first lenslet array 178a, but without any strict far field or near field positional restriction (as long as the modulator sites are not small enough to diffract, scatter, or diffuse appreciable light). In this case, the beam of light passing through each lenslet is split into relatively large adjacent regions, with the temporal coherence varying amongst the regions. However, if there are many modulator sites relative to the number of lenslets (P>>N), such that the electrically controllable de-speckling modulator 160 functions more like a diffuser, then de-speckling modulator 160 should be located in the near field of first lenslet array 178a. In that case, electrically controllable de-speckling modulator 160 may be located just before or just after lenslet array 178a, and should be nominally within the near field (<10*DOF) of the conjugate image plane (conjugate to the image plane at spatial light modulator 200). These configurations would work even better if the phase delays provided by de-speckle modulator 160 are significantly (2×–3×or more) larger than the coherence length ($\Delta\phi > C_L$).

In summary, laser display system 100 is designed to provide a projected image on a distant screen 215 that is free from perceptible speckle, by using a combination of speckle reduction/de-correlation techniques. The use of diffuser 150 not only re-defines the effective lagrange or etendue of the light, but also breaks the coherent incident beam into a multitude of smaller, less spatially coherent wavefronts. Thus use of a light integrating system, such as fly's eye integrator 175, which divides the light into beamlets which are reimaged to create a uniform area of illumination, also provides further speckle reduction by overlapping the many local contributions from the diffuser across the screen. Finally, the use of electrically controllable de-speckling modulator 160 provides means to disrupt the local phase of portions of the illuminating light, relative to other portions of the illuminating light, thereby altering the local spatial and/or temporal coherence relationships. This allows either the local wavefront phase structures, the temporal coherence relationships between wavefronts, or the temporal coherence across spatial areas to be altered. Furthermore, it should be noted that speckle reduction in laser display 100 could have diffuser 150 attached to a motion mechanism, which imparts a linear, rotary, or random motion to the diffuser, such that the diffuser 150 moves by at least the characteristic feature size of the diffusing surface. The frequency of the motion must be faster than the flicker frequency (>40 Hz). Speckle visibility is then further reduced by decorrelating the speckle pattern by time averaging the position and magnitude of the speckle in local areas across the full spatial extent of the image.

Depending on its construction and operation, the electrically controllable de-speckling modulator 160 may impart sufficient phase perturbations, such as diffraction or scatter, to the light beam to actually cause the source lagrange or etendue to be measurably increased. In the case of projection systems designed with a linear spatial light modulator 200 requiring a relatively coherent illumination in the array direction, a small change in source lagrange provided by the electrically controllable de-speckling modulator 160 may be sufficient to meet the imaging requirements of the projection system. In that case, the laser display system 100 may be constructed without a diffuser 150.

It also should be understood that the cross array optics in FIGS. 1 and 2a show a simplified optical system with just one cylindrical lens, cross array condenser 195. Cross array condenser 195 conditions the light beam in the cross array direction, to optimize it for interaction with linear spatial light modulator 200. It should be understood that multiple cylindrical lens elements could be used for this beam conditioning. It should also be understood that some of the lens elements within laser projection system 100 prior to linear spatial light modulator 200 could be spherical, and shape both the array and cross array beams. Likewise, projection lens 205 could also include cylindrical lenses (not shown), to provide further control of either the array direction or cross array direction spot formation at the screen 215. Similarly, it should be understood that cross array optics (not shown) could be provided prior to electrically controllable de-speckling modulator 160 to pre-condition the light beam so as to optimize the interaction of the light through the electrically controllable de-speckling modulator. In that case, cross array condenser 195 or equivalent would adapt the cross array light beam exiting electrically controllable de-speckling modulator 160 to optimize it for input to linear spatial light modulator 200. It should also be understood that alternate beam homogenizing optics to the fly's eye integrator could be used. In particular, an integrating bar/kaleidoscope, much as described in (Moulin patent), could be used within an alternate design for the beam shaping optics 170, and provide both uniform illumination, as well as a contributory effect to speckle reduction in cooperation with diffuser 150 and electrically controllable de-speckling modulator 160.

Figure 8:
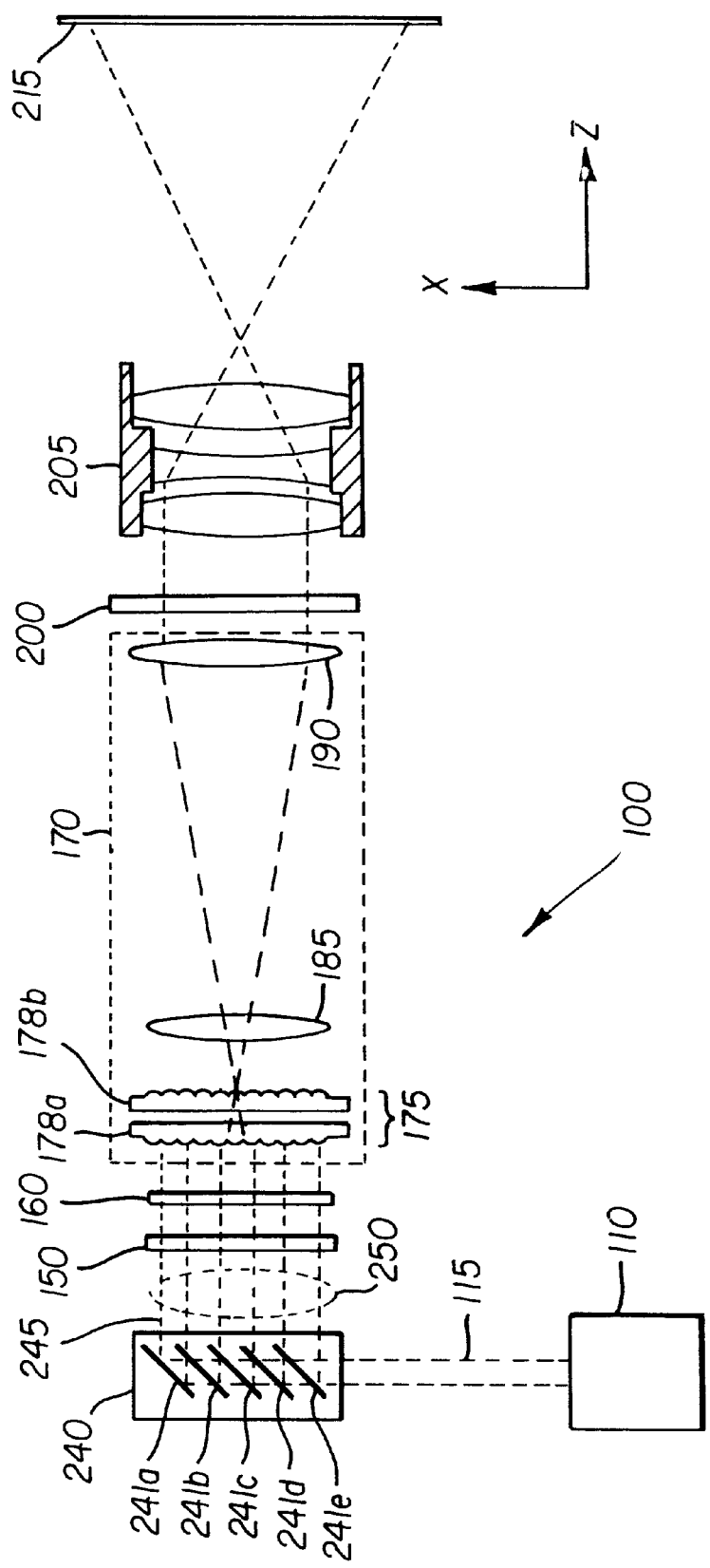
FIG. 8 is a cross-sectional view of an alternative embodiment of the laser display system according to the present invention, incorporating multiple delays on the order of the coherence length.

An alternate construction for laser projection display 100 is shown in FIG. 8, in which a beamsplitter array 240 is used to provide optical path delay differences so as to reduce the coherence of the composite laser beam 250. Beamsplitter array 240 comprises an arrangement of (R) partially reflecting mirrors, which create a series of beamlets 245 with optical path length differences ($\Delta d$) between adjacent beamlets 245 that are on the order of the coherence length of the laser or larger. Optimally the optical path differences (Δd) are on the same order of size as the coherence length $C_L$ of the laser 110. The mirrors of beamsplitter array 240 would be partially transmitting, and partially reflecting, with the reflectivity increasing progressively from the first mirror (241a) to the last mirror (241e). Although beamsplitter array 240 is illustrated as an array of mirrors, prism arrays and other structures could be used. Beamsplitter array 240 effectively works as a beam expander, using the R beamlets to create a composite laser beam 250. However, as the R beamlets travel different optical path lengths ($Δd_1$, $Δd_2$, $Δd_3$, etc . . . ) which are comparable to the coherence length $C_L$, the temporal coherence of the light will vary across the spatial extent of composite laser beam 250. Ideally, each of the R beamlets 245 are temporally incoherent relative to the others. However, the scheme is still useful even if the temporal coherence changes more slowly, such that groups of beamlets 245 are coherent to each other, as these groupings will tend to change randomly in time, as the coherent emissive state of the laser 110 fluctuates in time.

As the typical laser beam 115 has a non-uniform light intensity profile (a Gaussian profile being common), each of the beamlets 245 will also be non-uniform, and composite laser beam 250 will be non-uniform as well. As with the FIG. 1 system, diffuser 150 is inserted to change the effective source lagrange or etendue to match the imaging requirements. Diffuser 150 also helps to make composite laser beam 250 somewhat more uniform and less coherent. Again as previously, a fly's eye integrator 175 is used to both improve the illumination uniformity and reduce speckle visibility at spatial light modulator 200. However, in this case, first lenslet array 178a is designed to have each beamlet 245 illuminate M lenslets, so that each beamlet 245 is transformed into uniform illumination at the light valve. Thus there are a total of at least M×R lenslets in each lenslet array 178a and 178b. The effect at the screen 215 is that each of the R laser beams will produce their own fine speckle pattern dictated by the diffuser, the M fly's eye lenslet pairs used by a given beam, and the screen. The M×R speckle patterns will add incoherently to produce an overall averaging even without the use of electrically controllable de-speckling modulator 160 or the motion of diffuser 150. Although in some less critical applications, this degree of speckle reduction may be sufficient, for critical applications, laser display system 100 of FIG. 8 is further improved with the addition of electrically controllable de-speckling modulator 160. As the temporal coherence within composite laser beam 250 is already significantly variable, electrically controllable de-speckling modulator 160 can be used to alter the phase wavefronts within the beamlets 245, assuming the applied phase change is small relative to the coherence length ($Δϕ<<C_L$). As with the prior discussion, electrically controllable de-speckling modulator 160 can be positioned (see FIG. 8) within laser display 100 in advance of first lenslet array 178a, such that it is in the far field (well outside the depth of focus (DOF)) of the conjugate image plane of beam shaping optics 170. Similarly, as previously, electrically controllable de-speckling modulator 160 can be located in the downstream far field of the conjugate image plane, in proximity to second lenslet array 178b, either before as in FIG. 2b, or after. Alternately, if electrically controllable de-speckling modulator 160 provides phase changes comparable to the coherence length ($Δϕ∼C_L$), the modulator can be used to vary the temporal and spatial coherence across regions within each of the M lenslets, where these regions are relatively large compared to the wavelength of light (to neither scatter nor diffuse).

Thus far, this invention for a laser display system utilizing both an electrically controllable de-speckling modulator and a spatial light modulator for imparting image data, has been described with respect to the use of one dimensional light modulators. There are a wide variety of two dimensional (area) spatial light modulators which can be used in electronic projection systems, with liquid crystal light valves s (LCDs) and micro-mechanical mirror arrays (including the digital mirror devices (DMDs) from Texas Instruments) being the most prominent. Relative to the laser display system of FIG. 1, the primary impact of switching from a one dimensional spatial light modulator to a two dimensional type, is that both the illumination optics and the electrically controllable de-speckling modulator 160 must be modified to work two dimensionally. In that case, the fly's eye integrator 175 typically use fly's eye lenslet arrays 178 (a,b) laid out in a two dimensional pattern, where the lenslets have spherical surfaces. Likewise, diffuser 150 provides controlled two dimensional (or spherical) diffusion, rather than the one-dimensional diffusion preferred in the FIG. 1 linear system. Such diffusers are available as holographic diffusers from Physical Optics Corp. or a randomized microlens array from Corning-Rochester Photonics Corp.

The various examples of spatial light electrically controllable de-speckling modulator 160 detailed in FIGS. 3, 4, 6a and 6b are one dimensional or linear devices. It is possible to construct a two dimensional electrically controllable de-speckling modulator by stacking a series of these devices, or by placing a series of these devices in offset locations within the optical system. It should also be understood that other types of electrically controllable de-speckling modulators can be designed, which use other electro-optical materials more conducive to use as a two dimensional structure, which could then be placed in a laser display system with a two dimensional image modulating spatial light modulator array.

Figure 9:
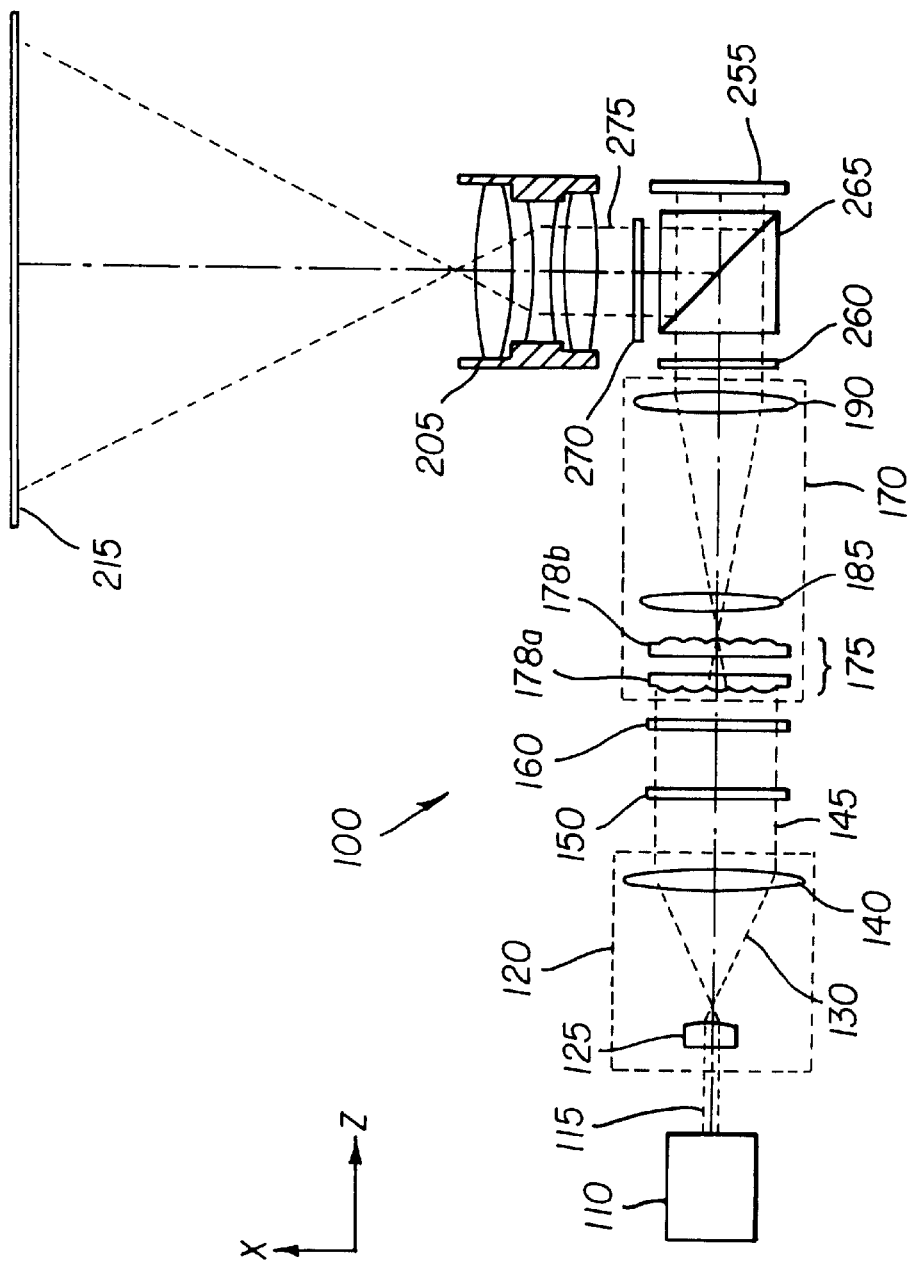
FIG. 9 is a cross-sectional view of the laser display system according to the present invention using a liquid crystal display light valve.

For example, FIG. 9 shows a cross sectional view of a laser projection display 100 using an area type modulator array, such as an LCD. As before, laser 110 emits a laser beam 115 which is pre-conditioned by beam expansion optics 120, diffuser 150, and beam shaping optics 170 to illuminate a spatial light modulator (liquid crystal display 255). And as previously, diffuser 150, fly's eye integrator 175, and electrically controllable de-speckling modulator 160 all contribute to reduce the presence of speckle across two dimensions at the spatial light modulator and at the screen 215. Unlike the system of FIG. 1, in the system of FIG. 9, a two dimensional on screen image is not formed by scanning, but by using projection lens 205 to directly image the spatial light modulator (liquid crystal display 255) to the screen 215. The illumination light passes through a pre-polarizer 260, and a polarization beam splitter 265. Liquid crystal display 255 modulates the illuminating light, rotating the polarization state of this light on a pixel by pixel basis, according to the applied command signals. Modulated image bearing light beam 275, which is directed to the screen 215 by projection lens 205, is formed by polarization rotated light which reflects off polarization beam splitter 265. Nominally polarization analyzer 270 is used in a crossed orientation, to define the dark state. As the typical laser source emits polarized light, it may not be necessary to utilize pre-polarizer 260 in the laser display 100 of FIG. 9. In this case, it would be necessary that laser beam 115, as emitted by laser 110, be sufficiently polarized (100:1 for example), and that neither diffuser 150 or electrically controllable de-speckling modulator 160 significantly degrade this innate polarization contrast.

Figure 10:
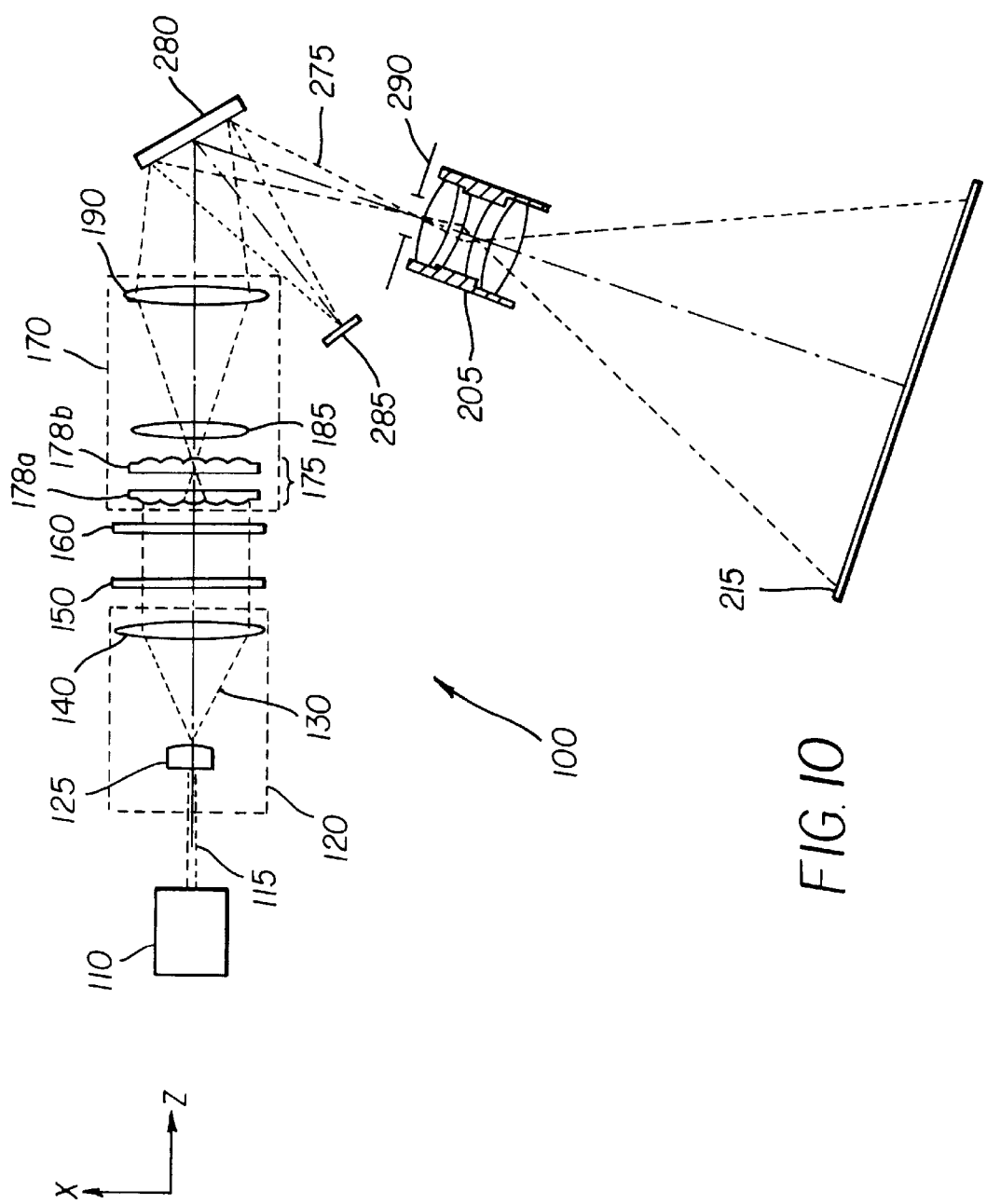
FIG. 10 is a cross-sectional view of an alternative embodiment of the laser display system according to the present invention using a micromirror-array light valve.

Similarly, FIG. 10 shows a cross-sectional view of a laser projection display using a micro-mechanical mirror array 280, such as the DLP chip available from Texas Instruments. Unlike systems using a liquid-crystal spatial light modulator, which rely on controlled polarization effects to modulate the light, the micro-mechanical mirror array 280 utilizes angular control of the beamlets of light on a pixel-by-pixel basis. This system is substantially the same as the system shown in FIG. 1, except the illumination converges to an aperture 290 beyond the micro-mechanical mirror light array 280. Individual pixels are formed by micromirrors that either direct light through the aperture 290 of the projection lens 205, or toward a stop 285 (i.e. a Schlieren optical system). Pixel brightness is controlled by selecting the proportion of time within a frame that light is directed through the lens aperture 290. This type of system can be constructed either with a two dimensional spatial light modulator array, a 2D fly's eye system, and a 2D electrically controllable de-speckling modulator 160 as in FIG. 10, or alternately with a 1D spatial light modulator array, a 1D fly's eye system, a 1D electrically controllable de-speckling modulator 160, and a scanner, such as the galvanometer used in FIG. 1.

For simplicity, the invention has been demonstrated with a single laser beam and single spatial light modulator, although the broader discussion has been directed towards a full color RGB projection display. It should be understood that a system can be constructed with separate red, green, and blue light beams which follow separate optical paths to illuminate the respective red, green, and blue spatial light modulators. The modulated light beams would be color combined, typically by an x-prism located before the projection lens, and the resulting light beam would be imaged to the screen to provide a polychromatic image. The separate red, green, and blue beams can originate from three separate lasers, from one OPO type laser package using a combination of non-linear optics to output three beams, or from an OPO type laser package integrated to provide a single white light laser beam output, which is subsequently color split.

The invention has been described in detail with particular reference to certain preferred embodiments thereof, but it will be understood that variations and modifications can be effected within the spirit and scope of the invention.

PARTS LIST 100 laser display system
110 laser
115 laser beam
120 beam expansion optics
125 diverging lens
130 diverging beam
140 collimating lens
145 collimated beam
150 diffuser
160 electrically controllable de-speckling modulator
175 fly's eye integrator
178a first lenslet array
178b second lenslet array
180 beam shaping optics
185 condenser lens
190 field lens
195 cross array condenser
200 linear spatial light modulator
205 projection lens
210 galvanometer mirror
215 screen
220 line image
225 area image
240 beamsplitter array
241(a–e) mirrors
245 beamlets
250 composite laser beam
255 liquid crystal display
260 pre-polarizer
265 polarization beam splitter
270 polarization analyzer
275 modulated image bearing light beam
280 micro-mechanical mirror array
285 stop
290 aperture
320 light
325 wave front
330 distorted wave front
340 input facet
345 output facet
350 modulator site
355 modulator site
360 modulator site
370 bulk material or substrate
380 delay region
385 top electrode
390 electrode
392 electrode
395 electrode
397 electrode
399 electrode
400 bottom electrode
405 buffer layer
410 overcoat
420 electrode
425 electrode
430 electrode
435 electrode

What is claimed is:

1. A display apparatus, comprising:
   a) a laser light source for emitting a light beam having a coherence length;
   b) a beam expander for expanding the light beam;
   c) a spatial light modulator;
   d) beam shaping optics for shaping the expanded laser beam to provide uniform illumination of the spatial light modulator, the beam shaping optics including a fly's eye integrator having an array of lenslets;
   e) a diffuser located in the light beam between the laser light source and the beam shaping optics;
   f) an electrically controllable de-speckling modulator for modifying the temporal and spatial phase of the light beam; and
   g) a projection lens for producing an image of the spatial light modulator on a distant screen.

2. The display apparatus claimed in claim 1, wherein the electrically controllable de-speckling modulator comprises a bulk electro-optic substrate and a series of modulator sites, wherein each modulator imparts controlled phase delays to the beam of light passing through each of said modulator sites.

3. The display apparatus claimed in claim 2, wherein the controlled phase delays are randomly time variant.

4. The display apparatus claimed in claim 2, wherein the modulator sites are defined by patterned electrodes on a surface of the substrate.

5. The display apparatus claimed in claim 2, wherein phase delays introduced by the de-speckling modulator are small relative to the coherence length of the laser light source; the number of modulator sites is much larger than the number of lenslets; and the de-speckling modulator is located in a far field of an imaged plane within the illumination system, or in one of its conjugates.

6. The display apparatus claimed in claim 5, wherein the beam shaping optics includes a pair of fly's eye lenslet arrays and the de-speckling modulator is located between the fly's eye lenslet arrays, such that the de-speckling modulator is located in a far field of the illumination plane conjugate to the image plane where the spatial light modulator resides.

7. The display apparatus claimed in claim 2, wherein phase delays introduced by the de-speckling modulator are small relative to the coherence length of the laser light source; the number of modulator sites is much larger than the number of lenslets; and the de-speckling modulator is located within the near field of an imaged plane within the illumination system, or in one of its conjugates.

8. The display apparatus claimed in claim 2, wherein phase delays introduced by the de-speckling modulator are on the same order as the coherence length of the laser light source, and the de-speckling modulator is located between the diffuser and the beam shaping optics.

9. The display apparatus claimed in claim 2, wherein phase delays introduced by the de-speckling modulator are on the same order as the coherence length of the laser light source, the beam shaping comprises a pair of fly's eye lenslet arrays and the de-speckling modulator is located between the fly's eye lenslet arrays.

10. The display apparatus claimed in claim 2, wherein phase delays introduced by the de-speckling modulator are on the same order as the coherence length of the laser light source, the beam shaping optics includes a fly's eye integrator with a pair of lenslet arrays each consisting of a number of lenslets, and the de-speckling modulator has a number of modulator sites which are greater than the number of lenslets of the first lenslet array, such that the phase delays alter the temporal and spatial coherence of the beam of light passing through each lenslet of a lenslet array without diffusing or scattering light.

11. The display apparatus claimed in claim 2, wherein phase delays introduced by the de-speckling modulator are on the same order as the coherence length of the laser light source, the beam shaping optics includes a fly's eye integrator with a first lenslet array and second lenslet array, and the de-speckling modulator has a number of modulator sites which is much greater than the number of lenslets of the first lenslet array, such that light is diffused or scattered, and the de-speckling modulator is located within the near field of the first lenslet array, which is image conjugate to the spatial light modulator.

12. The display apparatus claimed in claim 1, wherein the de-speckling modulator is adapted to operate on a plurality of wavelengths of light simultaneously.

13. The display apparatus claimed in claim 1, wherein the de-speckling modulator introduces phase delays from a spatial arrangement of modulator sites, relative to the extent of the beam of light passing through the modulator sites, such that the imaging wavefronts within the beam of light are altered in a spatially variant manner.

14. The display apparatus claimed in claim 1, wherein the de-speckling modulator has modulator sites which define different regions of the beam of light passing through the modulator sites, the de-speckling modulator introduces phase delays from the spatial arrangement of modulator sites, such that the temporal coherence is temporally and spatially variable amongst the regions.

15. The display apparatus claimed in claim 14, wherein the beam shaping optics includes a fly's eye integrator with a pair of lenslet arrays, and the number of modulator sites is larger than the number of lenslets in a lenslet array.

16. The display apparatus claimed in claim 1, where the beam expander comprises an array of partially reflecting mirrors to split the light beam into N beamlets, wherein adjacent beamlets propagate paths through the array of partially reflecting mirrors that differ by an amount on the order of the coherence length; and where the beam shaping optics modify the N beamlets to provide uniform illumination of the spatial light modulator.

17. The display apparatus claimed in claim 16, wherein the de-speckling modulator introduces phase delays from a spatial arrangement of modulator sites, relative to the extent of the beam of light passing through the modulator sites, such that the imaging wavefronts within the beam of light are altered in a spatially variant manner.

18. The display apparatus claimed in claim 16, wherein the de-speckling modulator has modulator sites which define different regions of the beam of light passing through the modulator sites, the de-speckling modulator introduces phase delays from the spatial arrangement of modulator sites, such that the temporal coherence is temporally and spatially variable amongst the regions.

19. The display apparatus claimed in claim 1, where the spatial light modulator is a liquid crystal display.

20. The display apparatus claimed in claim 1, where the spatial light modulator is an electro-mechanical mirror array.

21. Display apparatus, comprising:
  a) a laser light source for emitting a light beam;
  b) a beam expander for expanding the light beam;
  c) a linear spatial light modulator;
  d) beam shaping optics for shaping the expanded laser beam to provide uniform illumination of the spatial light modulator, the beam shaping optics including a fly's eye integrator having an array of lenslets;
  e) an electrically controllable de-speckling modulator for modifying the temporal and spatial phase of the light beam; and
  f) a projection lens and a scanning means for producing a two dimensional image on a distant screen.

22. Display apparatus according to claim 21, including a diffuser located in the light beam between the laser light source and the beam shaping optics.

23. Display apparatus according to claim 22, wherein the diffuser is a one-dimensional diffuser, providing light diffusion along the long axis of the linear spatial light modulator.

24. Display apparatus according to claim 22, wherein the spatial light modulator is an electro-optical diffraction grating.

25. Display apparatus claimed in claim 21, wherein the de-speckling modulator comprises a bulk electro-optic substrate and a series of modulator sites, wherein each modulator imparts controlled phase delays to the beam of light passing through each of said modulator sites.

26. Display apparatus claimed in claim 25, wherein the controlled phase delays are randomly time variant.

27. Display apparatus claimed in claim 21, wherein the de-speckling modulator introduces phase delays from a spatial arrangement of modulator sites, relative to the extent of the beam of light passing through the modulator sites, such that the imaging wavefronts within the beam of light are altered in a spatially variant manner.

28. Display apparatus claimed in claim 21, wherein the de-speckling modulator has modulator sites which define different regions of the beam of light passing through the modulator sites, the de-speckling modulator introduces phase delays from the spatial arrangement of modulator sites, such that the temporal coherence is temporally and spatially variable amongst the regions.

29. Display apparatus claimed in claim 28, wherein the beam shaping optics includes a fly's eye integrator with a pair of lenslet arrays, and the number of modulator sites is larger than the number of lenslets in a lenslet array.

30. Display apparatus claimed in claim 21, where the beam expander comprises an array of partially reflecting mirrors to split the light beam into N beamlets, wherein adjacent beamlets propagate paths through the array of partially reflecting mirrors that differ by an amount on the order of the coherence length; and where the beam shaping optics modify the N beamlets to provide uniform illumination of the spatial light modulator.

31. Display apparatus according to claim 21, wherein the spatial light modulator is an electro-mechanical diffraction grating.

32. Display apparatus, comprising:
    a) a laser light source for emitting a light beam;
    b) a beam expander for expanding the light beam;
    c) a spatial light modulator;
    d) beam shaping optics for shaping the expanded laser beam to provide uniform illumination of the spatial light modulator, the beam shaping optics including a beam homogenizer to provide uniform illumination of the spatial light modulator;
    e) a diffuser located in the light beam between the laser light source and the beam shaping optics;
    f) an electrically controllable de-speckling modulator to modify the temporal and spatial phase of the light beam; and
    g) a projection lens for producing an image of the spatial light modulator on a distant screen.

33. The display apparatus claimed in claim 32, wherein the controlled phase delays are randomly time variant.

34. The display apparatus claimed in claim 32, wherein the de-speckling modulator introduces phase delays from a spatial arrangement of modulator sites, relative to the extent of the beam of light passing through the modulator sites, such that the imaging wavefronts within the beam of light are altered in a spatially variant manner.

35. The display apparatus claimed in claim 32, wherein the de-speckling modulator has modulator sites which define different regions of the beam of light passing through the modulator sites, the de-speckling modulator introduces phase delays from the spatial arrangement of modulator sites, such that the temporal coherence is temporally and spatially variable amongst the regions.

36. The display apparatus claimed in claim 32, where the beam expander comprises an array of partially reflecting mirrors to split the light beam into N beamlets, wherein adjacent beamlets propagate paths through the array of partially reflecting mirrors that differ by an amount on the order of the coherence length, and where the beam shaping optics modify the N beamlets to provide uniform illumination of the spatial light modulator.

37. A method of displaying an image, comprising the steps of:
    a) providing a laser projector having:
        i) a laser light source for emitting a light beam;
        ii) a beam expander for expanding the light beam;
        iii) a spatial light modulator;
        iv) beam shaping optics for shaping the expanded laser beam to provide uniform illumination of the spatial light modulator; and
        v) a diffuser located in the light beam between the laser light source and the beam shaping optics;
    b) locating an electrically controllable de-speckling modulator in the light beam; and
    c) projecting an image on a screen with the laser projector, while operating the de-speckling modulator to modify the temporal and spatial phase of the light beam, thereby reducing the visibility of speckle in the projected image.

38. The display method in claim 37, wherein the temporal and spatial phase changes are imparted to the light beam in a randomly controlled time variant manner.

39. The display method claimed in claim 37, wherein the de-speckling modulator is operated as an analog voltage driven modulator.

40. The display method claimed in claim 37, wherein the de-speckling modulator is operated as a pulse width modulated device.

41. The display method claimed in claim 37, wherein the de-speckling modulator includes an electro-optic substrate having top and bottom electrodes that define modulator sites to which voltages are applied in accordance to control signals.

42. The display method claimed in claim 37, wherein the spatial light modulator comprises a linear array of modulator pixels, and the display method further comprises a scanning means for providing a two dimensional image.

43. The display method claimed in claim 37, wherein the beam shaping optics includes a fly's eye integrator comprising at least one array of lenslets.

44. A method of displaying an image, comprising the steps of:
    a) providing a laser projector having:
        i) a laser light source for emitting a light beam;
        ii) a beam expander for expanding the light beam;
        iii) a spatial light modulator; and
        iv) beam shaping optics for shaping the expanded laser beam to provide uniform illumination of the spatial light modulator;
    b) locating an electrically controllable de-speckling modulator in the light beam; and
    c) projecting an image on a screen with the laser projector, while operating the de-speckling modulator to modify the temporal and spatial phase of the light beam, thereby reducing the visibility of speckle in the projected image.

* * * * *